Oct. 21, 1952     W. H. PEACH ET AL     2,614,827
TUBULAR JOINT
Filed Jan. 4, 1946     4 Sheets-Sheet 1
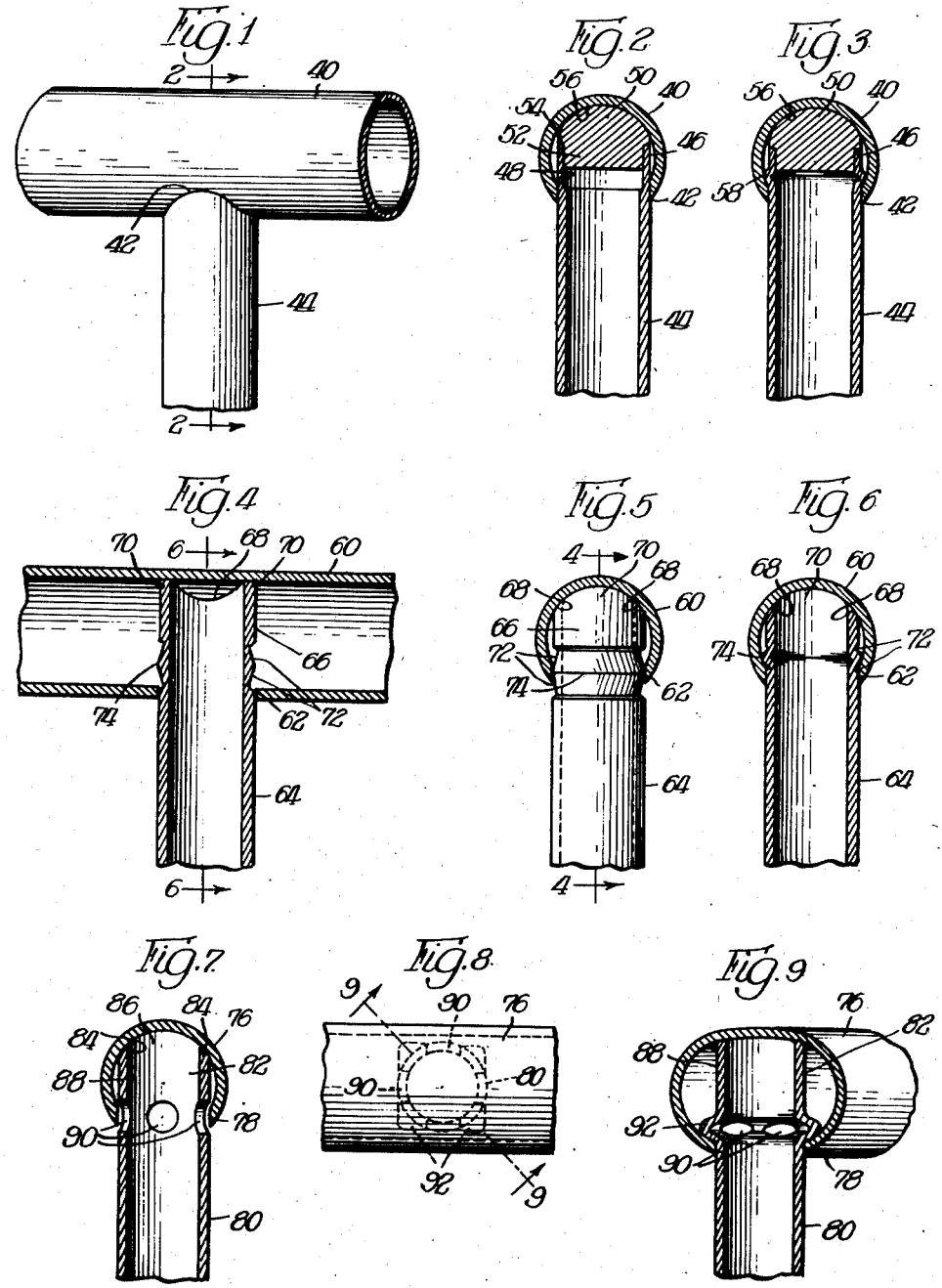
INVENTORS.
William H. Peach.
BY Royal D. Malm.

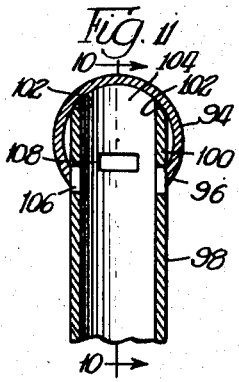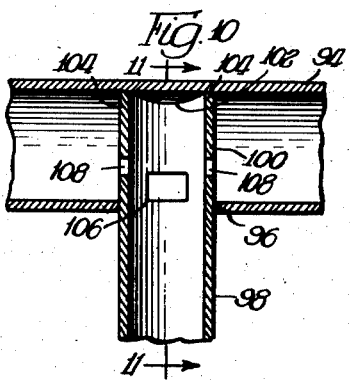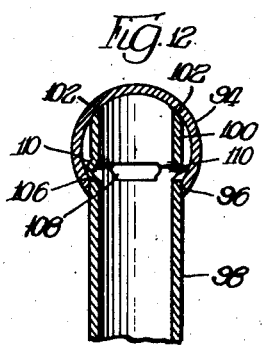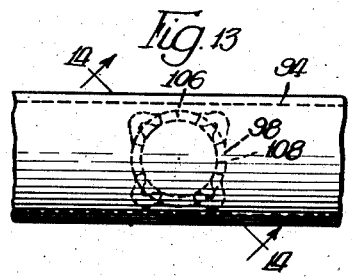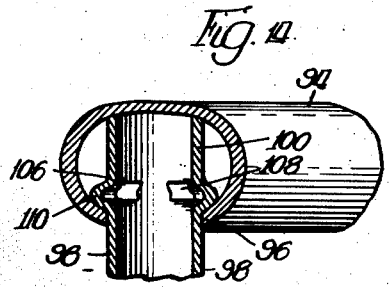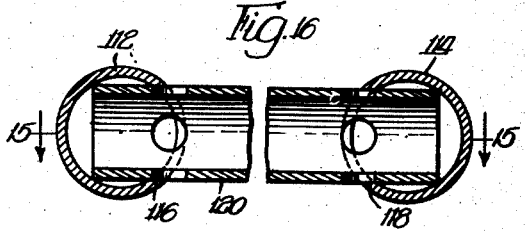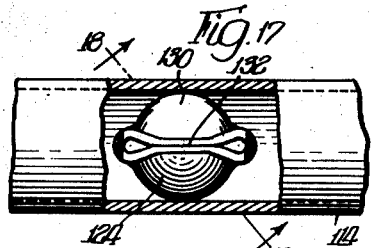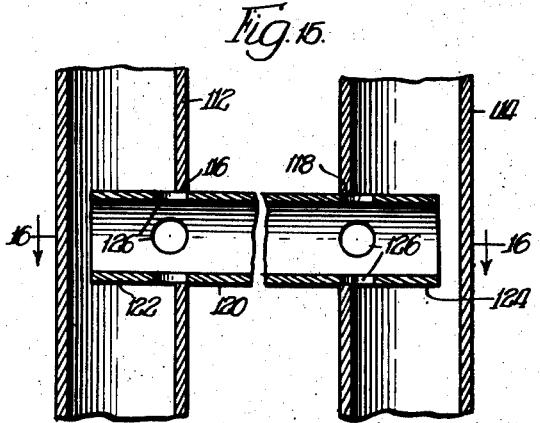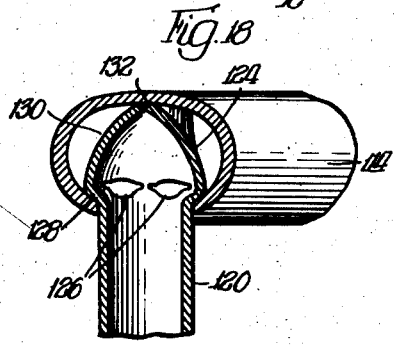

Oct. 21, 1952   W. H. PEACH ET AL   2,614,827
TUBULAR JOINT
Filed Jan. 4, 1946   4 Sheets-Sheet 3

INVENTORS.
William H. Peach,
BY Royal D. Malm.

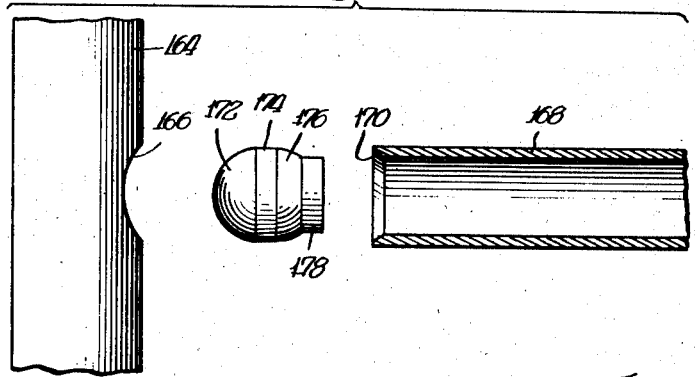
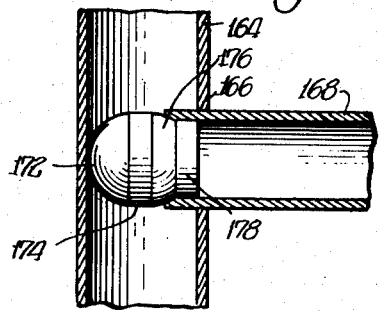
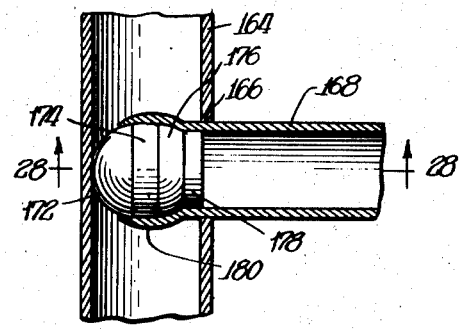
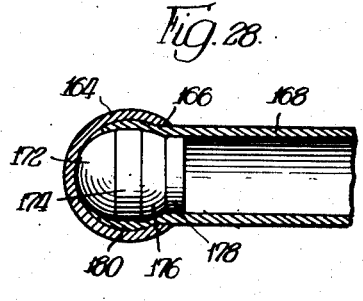
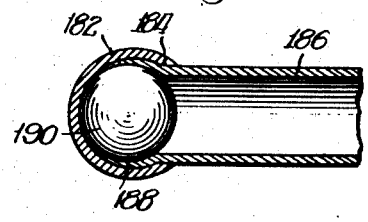

Patented Oct. 21, 1952

2,614,827

UNITED STATES PATENT OFFICE 2,614,827

TUBULAR JOINT

William H. Peach, Chicago, and Royal D. Malm, Evanston, Ill., assignors to Clayton Mark & Co., Evanston, Ill., a corporation of Delaware Application January 4, 1946, Serial No. 639,037

3 Claims. (Cl. 265—107)

This invention pertains to tubular joints and the method of connecting tubular members.

It is an object of this invention to provide tubular connecting means wherein a rigid, tight joint is attained.

Another object of this invention is to provide a tubular connecting structure of a permanent nature which is neat in appearance and inexpensive to effect.

Another object of this invention is to provide a tubular connecting structure of a permanent nature wherein the component parts can be plated or coated individually and be subsequently assembled into the finished structure without injury to the surface finish.

Another object of this invention is to provide a tubular connecting structure of a permanent nature wherein the parts can be plated prior to connection.

Another object of this invention is to provide a tubular connecting structure of a permanent nature wherein parts can be connected so that they are angularly or otherwise disposed one with respect to the other.

Another object of the invention is to provide a tubular connecting structure of a permanent nature and wherein once connected the parts are not relatively movable one with respect to the other.

Another object of the invention is to provide a tubular connecting structure of a permanent nature and one which is readily adapted for use in toys, furniture, office machinery, display racks, stands, handles for tools, as lawn mowers, carts, ladders, clothes racks, bedsteads, etc.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary perspective elevation of one form of joint construction embodying the invention;

Figure 2 is a transverse sectional elevation taken substantially in the plane as indicated by the line 2—2 of Figure 1, but showing the parts in position prior to effecting the joint;

Figure 3 is a fragmentary sectional elevation corresponding to Figure 2, but showing the parts subsequent to effecting the joint;

Figure 4 is a fragmentary sectional elevation through another form of joint embodying the invention, showing the parts in position prior to effecting the joint, the same being taken substantially in the plane as indicated by the line 4—4 of Figure 5;

Figure 5 is an elevation of the form of joint illustrated in Figure 4, a part thereof being shown in transverse section;

Figure 6 is a sectional elevation taken substantially in the plane as indicated by the line 6—6 of Figure 4, but showing the parts subsequent to effecting the connection;

Figure 7 is a fragmentary transverse sectional elevation corresponding to Figure 2 showing another form of connection embodying the invention, the parts being illustrated prior to effecting the connection;

Figure 8 is a top plan view of the connection between the parts illustrated in Figure 7;

Figure 9 is a sectional elevation taken substantially in the plane as indicated by the line 9—9 of Figure 8;

Figure 10 is a fragmentary sectional elevation through another form of joint embodying the invention showing the parts in position prior to effecting the joint, the same being taken substantially in the plane as indicated by the line 10—10 of Figure 11;

Figure 11 is a sectional elevation taken substantially in the plane as indicated by the line 11—11 of Figure 10;

Figure 12 is a sectional elevation corresponding to Figure 11 but showing the parts in position after the joint has been effected;

Figure 13 is a top plan view of the construction illustrated in Figure 12;

Figure 14 is a sectional elevation taken substantially in the plane as indicated by the line 14—14 of Figure 13;

Figure 15 is a fragmentary sectional elevation of another form of joint embodying the invention, showing the joint adapted for connecting two parallel members but in position prior to effecting the joint, the same being taken substantially in the plane as indicated by the line 15—15 of Figure 16;

Figure 16 is a sectional plan taken substantially in the plane as indicated by the line 16—16 of Figure 15;

Figure 17 is a fragmentary plan view of one of the joints of the construction illustrated in Figures 15 and 16 after the joint has been effected, a portion of the larger tube being cut away to show the shape of the end of the smaller connecting tube;

Figure 18 is a fragmentary sectional elevation taken substantially in the plane as indicated by the line 18—18 of Figure 17;

Figure 25 is a fragmentary, exploded view partly in section of a modified form of joint embodying the invention;

Figure 26 is a fragmentary sectional elevation through the modified form of joint illustrated in Figure 25 showing the parts in assembled position with respect to each other but prior to effecting the joint;

Figure 27 is a view corresponding to Figure 26 showing the parts after the joint has been effected;

Figure 28 is a fragmentary sectional elevation taken substantially in the plane as indicated by the line 28—28 of Figure 27; and Figure 29 is a sectional elevation similar to Figure 28 but showing a modified form of pilot member or deforming core member used in effecting the joint.

Figure 19:
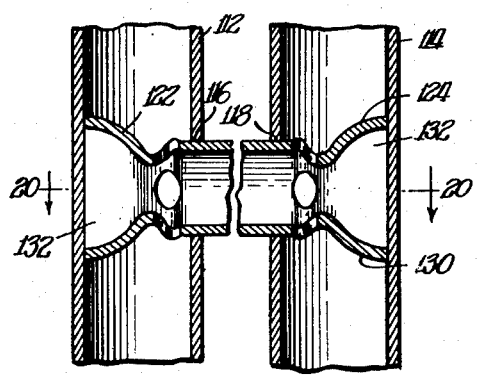
Figure 19 is a sectional elevation corresponding to Figure 15 but showing the joints subsequent to effecting connection.
Figure 20:
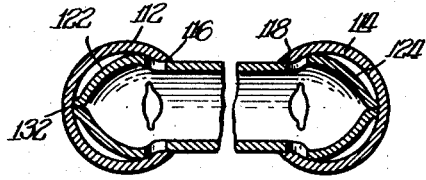
Figure 20 is a sectional plan view taken substantially in the plane as indicated by the line 20—20 of Figure 19.

Referring first of all, more particularly, to the joint construction illustrated in Figures 1 to 3 inclusive, the larger tube 40 is provided with the aperture 42 having substantially the same diameter as the outer diameter of the smaller tube 44 to permit the connecting end 46 of said tube 44 to be readily inserted within the tube 40 through aperture 42. The end 46 of tube 44 is weakened as by the recess 48, said recess being adapted to receive the pilot or deforming core member 50. Member 50 is provided with a cylindrical portion 52 adapted to fit in the recess 48, being positioned by means of the shoulder 54, the outer end 56 of the member 50 having a curved surface to substantially fit the inner, transverse curved surface of the tube 40 as shown in Figures 2 and 3.

After assembly of the parts as illustrated in Figure 2, tube 44 is forced inwardly of tube 40 as by a press or other suitable means, a suitable die or fixture preventing deformation of the external parts of tubes 40 and 44, and the weakened portion provided by the recess 48 will deform to cause a substantially circular locking shoulder 58 to be formed which follows the inner contour of tube 40 adjacent the aperture 42 whereby a tight connection is effected.

In the construction shown in Figures 4 to 6 inclusive, the outer larger tube 60 is provided with the aperture 62, the diameter of the aperture being substantially the same as the outer diameter of the smaller tube 64 whereby tube 64 may be extended within tube 60. The end 66 of tube 64 is provided with the diametrically opposed rounded portions 68, so rounded as to substantially fit the contour of the outer tube 60 and in effect forming opposed shoulders 70 arranged to be disposed in the direction of the axis of the tube 60 whereby an interlocking arrangement between tubes 60 and 64 is provided to prevent rotation of tube 64 with respect to tube 60. The end 66 of tube 64 is weakened by the circular recesses 72, angularly disposed with respect to each other, to form the thickened ridge 74.

After assembly of tube 64 with respect to tube 60, tube 64 is moved inwardly of tube 60 in the manner similar to that described with respect to Figure 1, causing the weakened portions 72 to deform wherein the ridge 74 provides a locking shoulder within tube 60.

In the construction shown in Figures 7 to 9 inclusive, the larger outer tube 76 is provided with the aperture 78 having substantially the same diameter as the outer diameter of the smaller tube 80, whereby the smaller tube may be inserted in the larger tube. The end 82 of tube 80 is provided with the opposed curved portions 84 adapted to be curved transversely of the axis of tube 76 and in effect forming spaced shoulders 86 adapted to be arranged in the direction of the axis of tube 76 whereby an interlocking relation between tubes 76 and 80 is effected, preventing rotation of tube 80 with respect to tube 76.

The end 88 of tube 80 is weakened as by drilling the opposed apertures 90, the apertures being so disposed with respect to the end of the tube that when tube 80 is pressed into tube 76, the apertures will permit a deformation to the end of tube 80 wherein in effect locking shoulders 92 are formed, the deformed apertures then being disposed wholly in tube 76.

In the construction illustrated in Figures 10 to 14 inclusive, the larger outer tube 94 is apertured as at 96, the diameter of said aperture being substantially the same as the outer diameter of the smaller tube 98 whereby the tube 98 may be readily inserted into tube 94 through said aperture. The end 100 of tube 98 is rounded as at 102, the rounded portions 102 being diametrically opposed to each other, and being adapted to fit the inner contour of tube 94, the rounding forming in effect shoulders 104 adapted to be aligned in the direction of the axis of tube 94 to form interlocking means preventing rotation between tube 98 and tube 94.

Tube 98 is provided with diametrically opposed apertures 106, which in the embodiment shown, are rectangular. Other apertures such as diametrically opposed rectangular apertures 108 are also provided. Apertures 106 and 108 may be of different sizes and the pairs of apertures may be disposed at different levels.

After assembly of the tubes as illustrated in Figure 10 tube 98 may be moved within tube 94 as described with respect to Figure 1, causing a portion of the tube 98 between apertures 106 and 108 to deform to provide locking shoulders 110.

In the construction illustrated in Figures 15 to 20 inclusive, the larger parallel tubes 112 and 114 are apertured as at 116 and 118, the diameter of the apertures 116 and 118 being substantially equal to the outer diameter of the connecting tube 120. In the embodiment shown tubes 112 and 114 are disposed with their axes parallel. It is, of course, understood, however, that they may be angularly disposed with respect to each other. The ends 122 and 124 of tube 120 are weakened by drilling opposed apertures 126, the apertures at the respective ends preferably being disposed 90° apart. The terminations of ends 122 and 124 are left in planes perpendicular to the axis of the tube 120 and will hereafter be referred to as squared ends, it being understood of course that a section of tube 120 is circular.

The joint is effected by forcing tube 120 into tubes 112 and 114 in a manner similar to that described with respect to Figure 1, which will cause the weakened end adjacent the apertures to deform providing the locking shoulders 128 and disposing the apertures 126 wholly within tubes 112 and 114. Forcing tube 120 within tubes 112 and 114 causes the ends of tube 120 to be deformed into upset portions which may be described as composed of two geometric figures. One is a curved surface 130 which is of general acorn-like appearance. The other surface or ridge 132, is a flattened end which fits the inner contour of the larger tube, that is, the surface 132 extends in the direction of the axes of tubes 112 and 114.

Figure 21:
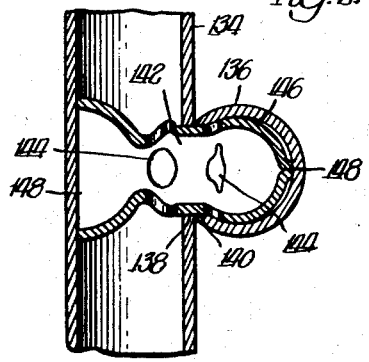
Figure 21 is a fragmentary sectional elevation showing a connection between tubes of the same size, the connection being effected so that the tubes connected are angularly disposed and closely adjacent to each other.

In the construction illustrated in Figure 21 the larger tubes 134 and 136 are each apertured as at 138 and 140, apertures 138 and 140 having a diameter substantially equal to the outer diameter of the connecting tube 142. The tubes 134 and 136 are disposed so that apertures 138 and 140 are aligned and tubes 134 and 136 are moved to contact each other in joined condition. Tube 142 is provided with the apertures 144, which, adjacent each end of the tube, are preferably disposed 90° apart.

When the joint is effected apertures 144 are deformed and the metal adjacent said apertures is deformed to effect the joint in a manner similar to that illustrated in Figures 16 to 20 inclusive, that is, locking curved surfaces 146 are provided similar to surfaces 130 and the locking ridge 148 is provided similar to ridge 132, it being seen that when the joint is effected apertures 144 are disposed within tubes 134 and 136, respectively.

Figure 22:
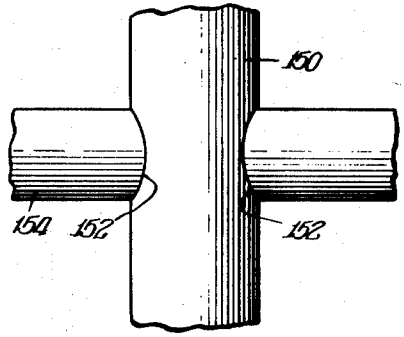
Figure 22 is an elevation of a connection between two tubes wherein one tube extends through the other.
Figure 23:
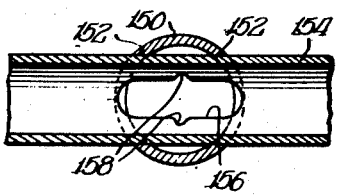
Figure 23 is a fragmentary sectional elevation of the joint illustrated in Figure 22, showing the tubes in position one with respect to the other prior to connection.
Figure 24:
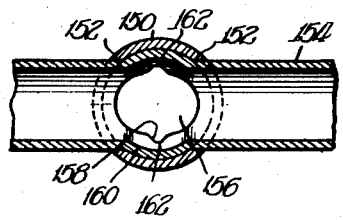
Figure 24 is a sectional elevation corresponding to Figure 23 showing the tubes in position subsequent to effecting the joint.

Referring now to the construction illustrated in Figures 22 to 24 inclusive, the larger tube 150 is provided with aligned apertures 152, the diameter of said apertures being substantially equal to the outer diameter of the tube 154 whereby tube 154 may be readily disposed through apertures 152. Tube 154 is provided with a pair of aligned, elongated apertures 156, which, in the embodiment shown, is of general elliptical shape which may midway thereof be provided with further cut out portions 158.

Tube 154 is pressed from each end into tube 150 causing tube 154 to deform the metal adjacent aperture 156 whereby interlocking portions 160 are provided, tube 154 within tube 150 generally following the contour of tube 150, locking shoulders 162 being formed in alignment with the cut out portion 158 and extending in the direction of the axis of tube 150. In this joint the bore of the smaller tube is unrestricted so that an inside mandrel may be utilized insuring a uniform upset and insuring that the inner tube will be unrestricted.

In the construction illustrated in Figures 25 to 28 inclusive, the larger tube 164 is provided with the aperture 166 the diameter of said aperture being substantially equal to the outer diameter of the smaller tube 168 whereby the end of tube 168 may be readily inserted through aperture 166 into tube 164. The end of tube 168, which is thereby projected into tube 164, may be reamed as at 170 to provide a substantially frusto-conical end surface. A piece of cylindrical bar stock having a diameter not in excess of the outer diameter of tube 168 is cut to form a slug. The slug is deformed so that it is provided with an outer rounded surface 172 adapted to generally fit the contour of the inside of tube 164 as illustrated in Figure 28, surface 172 merging into the cylindrical surface 174 which is substantially equal to the outer diameter of tube 168. Surface 174 merges into rounded (or frusto-conical) surface 176 which is adapted to fit within the frusto-conical or reamed surface 170 as illustrated in Figure 26, surface 176 terminating in cylindrical surface 178 having substantially the same diameter as the inner diameter of the tube 168 whereby the slug may be readily inserted into the smaller tube. When tube 168 is pressed into tube 164, the outer end of tube 168 is moved to embrace the formed slug which in its completed form may be referred to as a pilot or deforming core member. The end 180 of tube 168 follows around the pilot member even embracing the end 172 thereof, and, of course, is forced into tight engagement with the inside of tube 164 as shown in Figure 28.

In Figure 29 the larger tube 182 is provided with the aperture 184, the aperture having a diameter which is substantially the same as the outer diameter of tube 186 whereby tube 186 may be readily inserted into tube 182 through aperture 184; the end 188 of tube 186, in its undeformed condition may be reamed the same as tube 168 is reamed as at 170. A spherical ball 190 having a diameter greater than the inner diameter of tube 186, is received within the reamed end, and when tube 186 is pressed within the tube 182, the end 188 of tube 186 will follow around the ball 190 and into tight engagement with the inner wall of tube 182, as shown in Figure 29.

In the constructions shown it will be appreciated that where plating is desired, as chromium plating, it may be done prior to effecting the joint thereby insuring that all parts are covered so the joints won't oxidize. The joint so formed is very strong and rigid and will not work loose in use, and is not unsightly as is the case of a welded joint. Further the joint is a tight one wherein all deformation, holes, upset and the like are completely concealed within one of the tubes.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In combination, a pair of connected tubular members, the first member being larger in diameter than the second member, the first member having an aperture having a diameter at least as large as the outside diameter of the second member, the second member having a portion extending into said first member through said aperture, the end of the second tubular member within the first tubular member being in a plane normal to the axis of the second tubular member, a portion of the second tubular member extending into the first tubular member having a plurality of substantially circular holes forming weakened portions between said holes, said weakened portions being collapsed within the first tubular member providing spaced securing shoulders disposed within and engaging said first tubular member for preventing relative rotation between the tubular members.

2. In combination, a pair of connected tubular members, the first member being larger in diameter than the second member, the first member having an aperture having a diameter at least as large as the outside diameter of the second member, the second member having a portion extending into said first member through said aperture, the end of the second tubular member within the first tubular member being in a plane normal to the axis of the second tubular member, a portion of the second tubular member extending into the first tubular member having a plurality of substantially circular holes forming weakened portions between said holes, said weakened portions being collapsed within the first tubular member providing spaced securing shoulders disposed within and engaging said first tubular member.

3. In combination, a pair of parallel tubes, said tubes each having an aperture, a tubular member for connecting said tubes having end portions extending into the respective apertures of said tubes, a portion of the projecting ends of said tubular member being weakened and collapsed to form connecting means between said tubular member and said tubes.

WILLIAM H. PEACH.
ROYAL D. MALM.

REFERENCES CITED

The following references are of record in the file of this patent:

UNITED STATES PATENTS

| Number | Name | Date |
|---|---|---|
| 403,767 | Meyer | May 21, 1889 |
| 548,998 | Mannesmann | Oct. 29, 1895 |
| 1,035,655 | Swenson | Aug. 13, 1912 |
| 1,114,486 | Kimball | Oct. 20, 1914 |
| 1,280,244 | Kroedel | Oct. 1, 1918 |
| 1,734,025 | Zeibig | Oct. 29, 1929 |

FOREIGN PATENTS

| Number | Country | Date |
|---|---|---|
| 11,139 | Great Britain | Apr. 13, 1910 |
| 16,221 | Great Britain | of 1909 |
| 23,189 | France | May 14, 1921 |
| 227,589 | Great Britain | Jan. 22, 1925 |